(12) United States Patent
Mach et al.

(10) Patent No.: US 10,512,274 B2
(45) Date of Patent: Dec. 24, 2019

(54) APPARATUS FOR FILLING TUBULAR CASES

(71) Applicant: VEMAG Maschinenbau GmbH, Verden (DE)

(72) Inventors: Matthias Mach, Hannover (DE); Jan-Nils Hagedorn, Verden (DE); Heiner Matthies, Kalbe (DE); Olaf Grote, Eystrup (DE); Alexander Lewin, Verden (DE)

(73) Assignee: VEMAG Maschinenbau Gmbh, Verden/Aller (DE)

( * ) Notice: Subject to any disclaimer, the term of this patent is extended or adjusted under 35 U.S.C. 154(b) by 0 days.

(21) Appl. No.: 16/225,494

(22) Filed: Dec. 19, 2018

(65) Prior Publication Data

US 2019/0183135 A1 Jun. 20, 2019

(30) Foreign Application Priority Data

Dec. 20, 2017 (EP) .................................... 17209076

(51) Int. Cl.
*A22C 11/00* (2006.01)
*A22C 11/02* (2006.01)

(52) U.S. Cl.
CPC ...... *A22C 11/0227* (2013.01); *A22C 11/0263* (2013.01)

(58) Field of Classification Search
CPC ......... A22C 11/00; A22C 11/01; A22C 11/02; A22C 11/0209; A22C 11/0227
USPC ........... 452/21–26, 30–32, 35–37, 46–48, 51
See application file for complete search history.

(56) References Cited

U.S. PATENT DOCUMENTS

| 3,317,950 | A | 5/1967 | Ziolko | |
|---|---|---|---|---|
| 6,645,063 | B1 * | 11/2003 | Volkl | B26D 3/185 452/149 |
| 7,306,511 | B2 * | 12/2007 | Whittlesey | A22C 11/0209 452/45 |
| 7,637,804 | B2 * | 12/2009 | Jackel | A22C 11/0263 452/31 |
| 7,666,071 | B2 * | 2/2010 | Nakamura | A22C 11/0218 452/36 |

(Continued)

FOREIGN PATENT DOCUMENTS

| DE | 10001423 A1 | 7/2001 |
|---|---|---|
| DE | 102007025583 A1 | 1/2008 |
| EP | 3178326 A1 | 6/2017 |

*Primary Examiner* — Richard T Price, Jr.
(74) *Attorney, Agent, or Firm* — Wood Herron & Evans LLP (57) ABSTRACT

An apparatus for filling tubular cases with a pasty material, such as gathered sausage skin casings with sausage meat, is provided. The apparatus includes at least one filling tube, which is rotatable and drivable about its longitudinal axis and on to which a case which can be filled with the material can be pulled, a receiving portion at which the filling tube is rotatably received, and a drive unit for driving the filling tube. The apparatus advantageously includes a magnetic coupling for making and breaking an at least force-locking torque transmission between the drive unit and the filling tube, which has a drive rotor and a driven roller that is displaceable relative to the drive rotor in the longitudinal direction of the filling tube. Thus, the positioning during filling is reliable and performed with simplified structure. A filling machine including the apparatus is also provided.

17 Claims, 6 Drawing Sheets

(56) References Cited

U.S. PATENT DOCUMENTS

2008/0311835 A1 12/2008 Nakamura et al.
2017/0156353 A1 6/2017 Betz et al.

\* cited by examiner

APPARATUS FOR FILLING TUBULAR CASES

CROSS-REFERENCE TO RELATED APPLICATION

This application claims priority to European Patent Application No. 17209076.3, filed Dec. 20, 2017. The above-mentioned patent application is incorporated herein by reference in its entirety.

TECHNICAL FIELD

The invention relates to an apparatus for filling tubular cases with a pasty material, in particular, for filling gathered sausage skin casings with sausage meat.

BACKGROUND

Several previously known filling apparatuses are used in the industrial production of sausages. The filling apparatuses are employed in conjunction with filling machines for producing strings of sausages, by which a pasty material like sausage meat or the like is produced and introduced into or put into a tubular case. The operation of introducing the pasty material into the tubular case can be performed continuously or in portion-wise fashion. An artificial casing or a natural skin casing can be used as the tubular case, also referred to as a gathered sausage skin casing. The term pasty material is used in the present case to denote a foodstuff material which is capable of flow and which can be transported by way of a tubular conduit by being subjected to a pressure. A dough material is also to be interpreted as the pasty material in the present case besides a meat or sausage material.

After the operation of introducing the material into the tubular case a case portion which has already been filled is closed for example by rotating the upstream-disposed filling tube. In that case the filling tube with the gathered tubular cases disposed thereon is in contact with a casing braking unit which cooperate with each other in such a way that the filling tube and the case pulled onto the filling tube jointly perform a rotary movement and a twist-off location can be generated. In addition, the case braking unit holds the case tight in the filling operation. After a tubular case which has been drawn on to the filling tube has been completely filled, a change in case is necessary in which a fresh case is drawn on to the filling tube.

The filling tube and the casing braking unit are to be separated from each other for pulling on a fresh case. For that purpose, the casing braking unit can firstly be moved in the axial direction relative to the filling tube by way of a manually actuatable adjusting device, and then pivoted laterally. The front end of the filling tube is accessible in that way so that a fresh tubular case can be drawn on to the filling tube. For bringing the casing braking unit into contact with the freshly fitted filling tube the casing braking unit is firstly to be pivoted laterally by way of the adjusting device in the opposite sequence, and then moved in the longitudinal direction of the filling tube.

For implementing the successive movement steps which are necessarily to be carried out by the casing braking unit when changing the case, the casing braking unit is mounted to the known filling apparatuses by way of an adjusting device involving a structurally complicated operating principle.

Therefore, the object of the present invention is to provide an apparatus for filling tubular cases of the above-indicated kind, in which the operation of equipping a filling tube with a fresh tubular case is reliably possible with a structural configuration which is simplified at the same time.

SUMMARY

The object of the invention is attained in an apparatus for filling tubular cases of the above-indicated kind in accordance with the features described below. In one embodiment, the apparatus is provided with a magnetic coupling for making and breaking an at least force-locking torque transmission between the drive unit and the filling tube, which has a drive rotor and a driven roller which is displaceable relative to the drive rotor in the longitudinal direction of the filling tube.

The invention is based on the realization that a torque can be transmitted from the drive unit to the filling tube by a magnetic coupling without the filling tube being necessarily mechanically coupled to the drive unit. As a result, it can be that, instead of the casing braking unit, the filling tube is moved in the axial direction and thus transferred into a loading position in which a fresh case can be drawn on to it. For bringing it into contact with the casing braking unit once again the filling tube is now moved in the opposite direction. As a result, the free end of the filling tube, equipped with the fresh tubular case, moves into the casing braking unit. At the same time the force-locking connection is made between the drive rotor and the driven rotor for force-locking torque connection (without mechanical inter-engagement of a coupling device for transmitting the drive movement from the drive unit to the filling tube). In one aspect, a magnetic coupling is used, the drive rotor and the driven rotor of which have contact surfaces which can be brought into contact with each other for the force-locking transmission of torque.

In another aspect, the magnetic coupling is a contact-less magnetic coupling, the drive rotor is in the form of an external rotor and the driven rotor is in the form of an internal rotor with coaxially arranged axes of rotation, which cover each other over at least portion-wise for transmission of the torque in the axial direction. The provision of a contact-less magnetic coupling represents an advantageous option in terms of the force-locking transmission of torque. The drive rotor and the driven rotor can be coupled together or uncoupled from each other by simple movement of the components. The force-locking relationship can thus be easily disconnected and restored. The design configuration in the form of internal and external rotors which partially overlap each other at least in the axial direction provides that the filling tube can move up in the axial direction in on-going operation without influencing the flow of force from the drive unit in the direction of the filling tube.

In a further aspect, the magnetic coupling is in the form of a permanent magnet coupling, the drive rotor and/or the driven rotor respectively have one or more permanent magnets. The use of permanent magnets on the drive and/or driven rotor allows the magnetic coupling to be of a simplified design configuration in the form of a contact-less permanent magnet coupling. A plurality of and an identical number of permanent magnets are respectively arranged on the drive rotor and the driven rotor. In some embodiments, mutually adjacent permanent magnets are arranged with an alternate orientation of their poles at the internal and external rotors respectively. In an embodiment of the invention the drive and driven rotors have an even number of permanent magnets of at least 6, 8, 10 or more permanent magnets.

In some embodiments, the magnetic coupling is in the form of an electromagnetic coupling, the drive rotor and/or the driven rotor respectively have one or more electromagnets. Instead of being implemented by permanent magnets the required magnetic field between the drive rotor and the driven rotor is then produced by a respective coil on the drive rotor and the driven rotor which have a corresponding number of windings or by a plurality of coils through which current flows on the drive rotor and the driven rotor.

In yet another aspect, the magnetic coupling according to the invention can also be provided by a combination of one or more electromagnets, for example, arranged on the drive rotor and a plurality of permanent magnets arranged on the driven rotor. In this structure the drive rotor is in the form of the stator with a rotating magnetic field (this is also referred to as a rotating field). In that way it is possible to dispense with a separate drive unit for mechanically driving the drive rotor.

In one aspect, the receiving portion is mounted in a displaceable manner by a guide device in the longitudinal direction of the filling tube. The receiving portion to which the filling tube is rotatably coupled with at least one of its ends can be displaced in the longitudinal direction of the filling tube. In one example, the filling tube is arranged on the receiving portion by way of a rotary bearing. The receiving portion itself is carried non-rotatably on the filling apparatus according to the invention. With the displacement of the receiving portion, the filling tube which is mounted fixedly in the axial direction relative to the receiving portion is also moved at the same time in its longitudinal direction. In another example, the receiving portion has a central axis extending coaxially with a central axis of the filling tube. For moving the filling tube into its loading position a displacement force acting for the displacement movement of the receiving portion is generated at the guide device or the receiving portion.

In another aspect, the guide device has at least one guide carriage moveable along a guide extending parallel to the filling tube. The receiving portion for the filling tube which is mounted rotatably thereto is fixedly connected by the guide carriage, the guide guiding the guide carriage includes two guide elements which extend in mutually parallel relationship and which, in particular, are oriented parallel to the longitudinal axis of the filling tube on the filling apparatus. The guide carriage and the guide carrying the guide carriage form a sliding guide. For displacement of the guide carriage along the guide the guide carriage is coupled to an adjusting drive like for example a belt drive.

In a further aspect, the guide device with its guide elements and the guide carriage carried in a displaceable manner along the guide elements has an adjusting range which is greater than the overall length of the filling tube.

In yet another aspect, the driven rotor is coupled non-rotatably to the filling tube, in particular, being non-rotatably connected to the filling tube. That ensures reliable transmission of the rotary movement produced by the drive unit to the filling tube by way of the magnetic coupling. In some embodiments, the driven rotor is coupled directly to the filling tube. In another embodiment of the filling apparatus according to the invention the driven rotor is non-rotatably connected by way of a coupling portion or a component carrying the filling tube.

In one aspect, the driven rotor is arranged at a feed conduit for the pasty material to be processed and guided through the filling tube, at the free end of which a first end of the filling tube is disposed, and/or the feed conduit is mounted at least with a portion rotatably to the receiving portion. The driven rotor is connected non-rotatably to the filling tube by way of the feed conduit. In particular a fluidic communication of a conveyor pump connected upstream of the feed conduit for the pasty material in the direction of the filling tube is implemented by the feed conduit. The feed conduit is carried with a portion on the receiving portion by way of a rotary bearing. The filling tube is arranged in particular at the free end of the feed conduit, the feed conduit and the filling tube having central axes arranged coaxially. That avoids imbalance and any vibrations and oscillations linked thereto upon rotation of the filling tube. In another aspect, the feed conduit is of an outside diameter which a multiple greater than the outside diameter of the filling tube. In an embodiment of the invention the outside diameter of the feed conduit relative to the outside diameter of the filling tube is in a ratio in a range of about 3:1 to about 10:1. In an alternative configuration the outside diameter of the feed conduit can also be smaller than the outside diameter of the filling tube.

In yet another aspect, the feed conduit rotatably carried on the receiving portion is in the form of a variable-length telescopic tube or a portion of the feed conduit is in the form of a deformable conveyor hose. The provision of a telescopic tube or a conveyor hose as a portion of the feed conduit provides for an adjusting movement of the filling tube in the axial direction thereof and linked thereto a variation in the spacing between the receiving portion of the filling apparatus, that carries the filling tube, and a conveyor pump connected upstream of the filling apparatus. That therefore avoids fluidic decoupling of the filling tube from the conveyor pump or displacement of the entire filling machine with its conveyor pump in the longitudinal direction of the filling tube. In some embodiments, the feed conduit in the form of the telescopic tube has a plurality of tube portions which can be pushed into each other, of differing diameters. The tube portions are fluid-tight relative to each other by way of suitable seals. A flexible conveyor hose used as the feed conduit is laid in the form a loop in a possible embodiment so that the direction of flow of the pasty material into the conveyor hose and the direction of exit of the pasty material from the conveyor hose in the present embodiment are mutually opposite directions.

In a further aspect, using a conveyor hose as the feed conduit, the outlet region of a conveyor pump connected upstream of the filling apparatus and the inlet region of the receiving portion, in the form of at least a portion of the feed conduit, involve a lateral or radial displacement. The filling tube of the filling apparatus is not oriented in aligned relationship with a conveyor pump which can be connected upstream of the filling apparatus.

In one aspect, the drive rotor with respect to its axis of rotation is arranged to be stationary in the axial direction with respect to the drive unit, within a twist-off housing. The stationary arrangement of the drive rotor relative to the drive unit in the axial direction provides for a simplified transmission of the rotary movement to the drive side of the magnetic coupling. The drive unit and the drive rotor of the magnetic coupling are thus in a fixed orientation relative to each other so that transmission of the rotary movement can be performed by way of an invariable-length transmission means.

In another aspect, the drive rotor is coupled to the drive unit for transmission of a rotary movement by a toothed belt. Spacings occurring between the drive rotor and the drive unit can be easily bridged over by a toothed belt. In addition, slip-free transmission of the torque generated by the drive unit is ensured by the toothed belt. In particular rotary movements which are produced in intervals, that is to say rotary movements which start and are stopped again at relatively short periods of time, can be transmitted to the drive rotor in slip-free relationship by way of a toothed belt.

In yet another aspect, a tooth coupling is provided for positively lockingly coupling the drive rotor and the driven rotor, and coupling portions which can be brought into engagement with each other are respectively coupled to the drive rotor and the driven rotor. Additional coupling portions are provided on the drive and driven rotors, which can be brought into operative relationship with each other to form a positively locking connection between the drive rotor and the driven rotor. Slip-free transmission of the torque is further improved with the provision of a tooth arrangement on the drive rotor and on the driven rotor, which are brought into engagement with each other when the filling tube is arranged in its position of being moved into the casing braking unit. In an embodiment of the invention pre-alignment of the drive rotor and the driven rotor relative to each other is performed by way of the permanent magnets on the drive rotor and on the driven rotor. The coupling portions of the tooth coupling are oriented in mutually aligned relationship by the components of the magnetic coupling, that are otherwise displaceable independently of each other.

In a further aspect, the coupling portions have a plurality of positively locking elements which project in the radial direction inwardly on the drive rotor and outwardly in the radial direction on the driven rotor, which are adapted to be brought into engagement with each other and out of engagement with each other by a movement of the drive rotor and the driven rotor in the longitudinal direction of the filling tube. The coupling portion on the drive rotor has an internal tooth arrangement and the coupling portion on the driven rotor has an external tooth arrangement. The internal and external tooth arrangements can be brought into contact or engagement with each other by simply moving the driven rotor in the axial direction relative to the stationary drive rotor. In some embodiments, an abutment-free connection is provided between the coupling portions on the drive rotor and on the driven rotor, so that if necessary a moving-up movement of the filling tube in the direction of the casing braking unit can take place by the filling tube which is coupled to the driven rotor, during the twisting-off operation.

In one aspect, the tooth arrangement on each of the coupling portions has an entry region with conically converging guide surfaces which simplify the entry movement of the inwardly and outwardly projecting positively locking elements respectively of the respective tooth arrangements into each other.

The apparatus of the embodiments of this invention is further distinguished by a casing braking unit which can be selectively operatively connected to a case drawn on to the filling tube in the region of the oppositely disposed second open end of the filling tube. A case which is pulled on over the filling tube is held taut by the casing braking unit during the operation of filling it with the pasty material. For that purpose, the casing braking unit has a casing braking ring which can be brought into contact with the tubular case and also with the filling tube and which is rotatably carried at the holder for the casing braking unit. The casing braking unit is arranged in an invariable position at the filling apparatus according to the invention. The necessary relative movement for bringing the filling tube out of contact from the casing braking unit is now implemented by the filling tube itself, by displacement of the filling tube in its axial direction. After the filling tube has been brought out of contact with the casing braking unit a fresh tubular case can be drawn on to the filling tube in an automated procedure or by hand.

In another embodiment of the invention, a filling machine for producing sausages of pasty material, in particular sausage meat, includes at least one filling hopper for receiving the pasty material, a conveyor pump for conveying the pasty material, and an apparatus for filling tubular cases with a pasty material, in particular gathered sausage skin casings with sausage meat.

On a filling machine having a filling apparatus of such a design configuration according to the invention, a torque is transmitted from a drive unit to a filling tube by a magnetic coupling without the filling tube necessarily being mechanically coupled to the drive unit. In addition, it is possible, instead of the casing braking unit, to simply move the filling tube in the axial direction and thus transfer it into a loading position. A fresh case can be drawn on to the filling tube in the loading position. For again bringing it into contact with the casing braking unit the filling tube is again moved, in particular slid, axially in the opposite direction. As a result, the free end of the filling tube, that is equipped with the fresh tubular case, comes into contact again with the stationary casing braking unit. With the movement of the filling tube into the casing braking unit the force-locking connection between a drive rotor and a driven rotor of the magnetic coupling is also produced. In that case the drive rotor and the driven rotor cooperate with each other in such a way that the torque-transmitting connection is ensured between the drive unit and the filling tube which is to be driven at intervals. In some embodiments, the magnetic coupling is a contact-less magnetic coupling which is in the form of a permanent magnet coupling in an embodiment, in which case the drive and/or driven rotors each have one or more permanent magnets respectively.

Advantageous developments of the filling machine according to the invention will be apparent from the foregoing description and the above-described developments of the filling apparatus according to the invention and the preferred configurations thereof. In that respect attention is directed to the foregoing description.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

Figure 1:
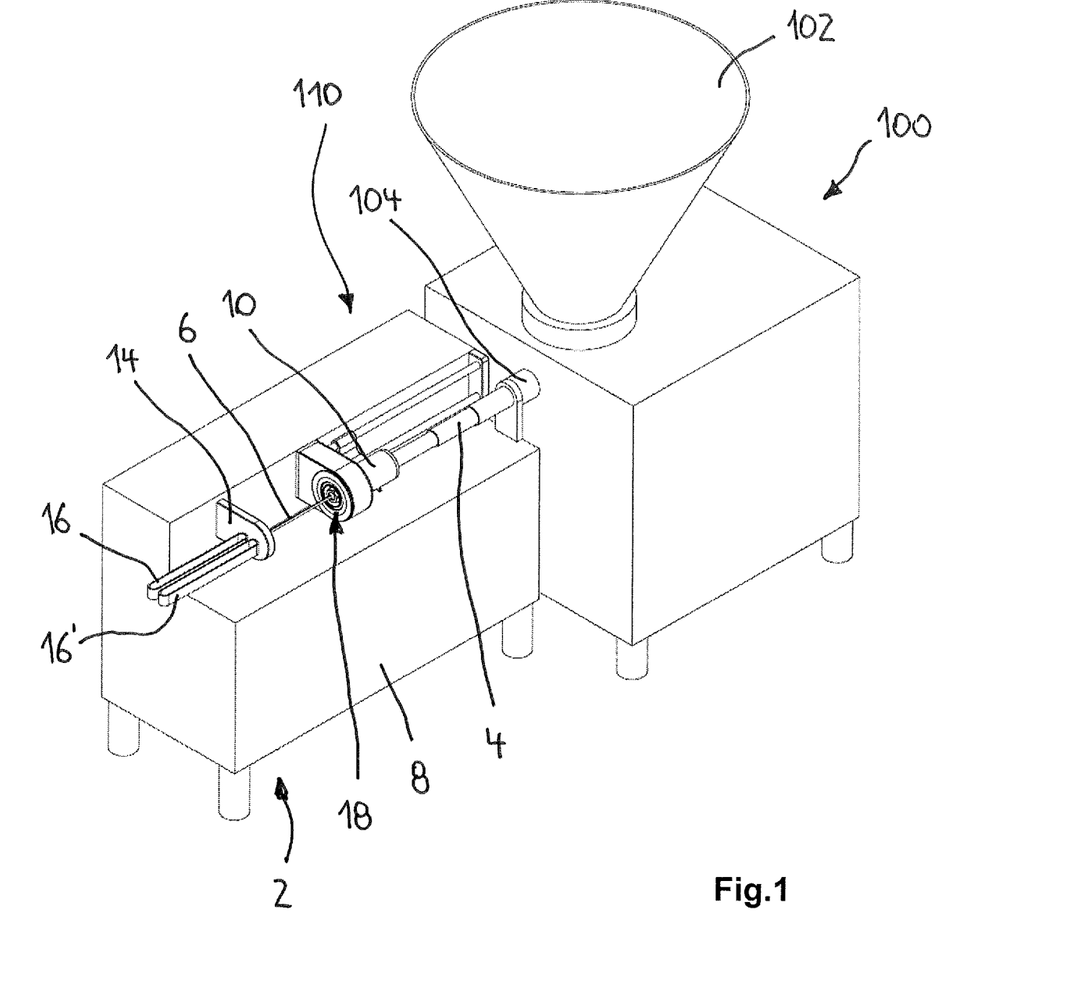
FIG. 1 shows a perspective view of a machine for filling tubular cases in accordance with a first embodiment of the invention.

FIG. 1 shows a machine 100 for filling tubular cases, in particular artificial casings and natural skin casings, in conjunction with an attachment 110. The attachment is a filling apparatus 2 according to the invention for filling tubular cases with a pasty material. The filling machine 100 further has a filling hopper 102 and an extrusion head 104. The extrusion head 104 is fluidically coupled to a filling tube 6 of the filling apparatus 2 by a feed conduit 4. The filling machine 100 further includes at least one conveyor pump (not shown) for conveying a material introduced into the filling hopper 102 in the direction of the extrusion head 104 and the feed conduit 4 connected thereto.

The filling apparatus 2 includes a machine frame structure 8 at which the filling tube 6 which is drivable and rotatable about its longitudinal axis is rotatably mounted at a receiving portion 10. The filling apparatus 2 further includes a drive unit 12 (FIG. 8) for driving the filling tube 6. Arranged at the filling apparatus 2 is a casing braking unit 14 with at least one casing braking ring 14' mounted rotatably on the casing braking unit. Two conveyor elements 16, 16' which extend at a spacing relative to each other in a horizontal plane are arranged connected downstream of the casing braking unit 14 in the conveyor direction of the sausages to be produced. Discharge of a string of sausages which is produced at least with the filling apparatus 2 and subdivided into individual portions is performed by the conveyor elements 16, 16'.

Figure 2:
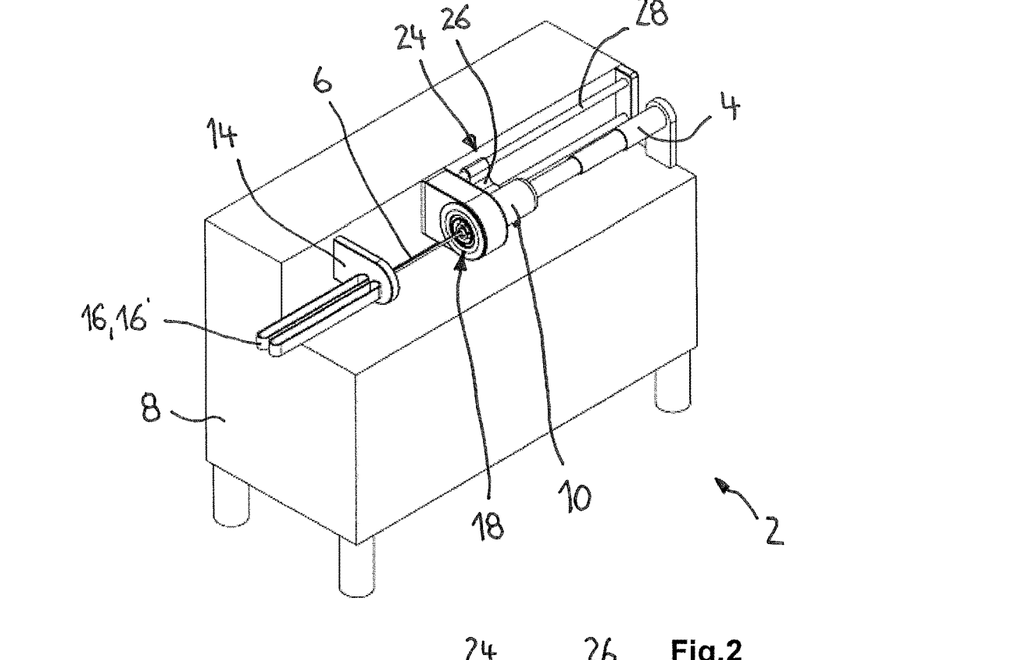
FIG. 2 shows a perspective view of the filling apparatus of FIG. 1 with the filling tube in one position.
Figure 3:
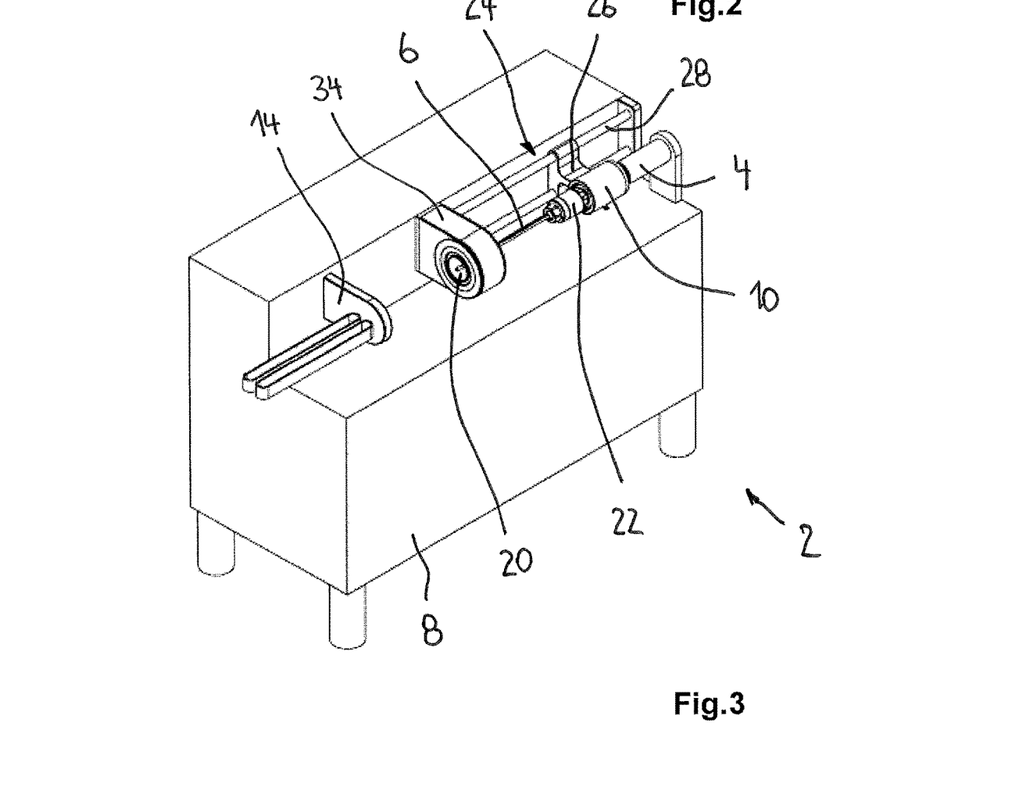
FIG. 3 shows a perspective view of the filling apparatus of FIG. 2 with the filling tube in another position.

FIGS. 2 and 3 show a view on an enlarged scale of the filling apparatus 2 according to the invention. As a transmission element for the rotary movement produced by the drive unit 12 (FIG. 8) to the filling tube 6 the filling apparatus has a magnetic coupling 18 for making and breaking an at least force-locking torque transmission between the drive unit 12 and the filling tube 6. The magnetic coupling 18 is in the form of a contact-less magnetic coupling and has a drive rotor 20 and a driven rotor 22. The drive rotor 20 is non-rotatably connected to the drive unit 12. The driven rotor 22 is non-rotatably coupled to the filling tube 6. The part of the magnetic coupling 18, which includes the drive rotor 20, is arranged in a stationary manner in the axial direction of the filling tube 6 on the machine frame structure 8 of the filling apparatus 2. The driven rotor 22 is arranged together with the filling tube 6 rotatably on the receiving portion 10. The receiving portion 10 itself is mounted slidably in the longitudinal direction of the filling tube 6 by a guide device 24. The driven rotor 22 is associated with the outlet end of the feed conduit 4 which in the present embodiment is carried rotatably on the receiving portion 10.

In the present embodiment the guide device 24 has a guide carriage 26 and two guide elements 28 carrying the guide carriage 26. The receiving portion is arranged on the guide carriage 26 in such a way that the axis of rotation of the filling tube 6 and of the driven rotor 22 is arranged coaxially with the axis of rotation of the drive rotor 20 and the casing braking ring 14'. The axis of rotation of the filling tube 6 and the longitudinal axis of the feed conduit 4 are also arranged coaxially. In the present embodiment the feed conduit 4 is in the form of a telescopic tube.

FIG. 2 shows the filling or twisting-off position of the filling tube 6, wherein the drive rotor 20 and the driven rotor 22 have been brought into force-locking operative relationship with each other. The drive rotor 20 is in the form of an external rotor and the driven rotor 22 is in the form of an internal rotor. The drive rotor 20 and the driven rotor 22 therefore at least portion-wise cover each other in the axial direction. The drive rotor and the driven rotor are not in contact with each other. For moving the filling tube 6 from its filling position in FIG. 2 into the loading position in FIG. 3 movement of the guide carriage 26 and the receiving portion 10 carried thereon is performed by an adjusting drive (not shown). The adjusting drive moves the receiving portion 10 together with the driven rotor 22 and the filling tube 6 in the longitudinal or axial direction relative to the axis of rotation of the filling tube.

Figure 4:
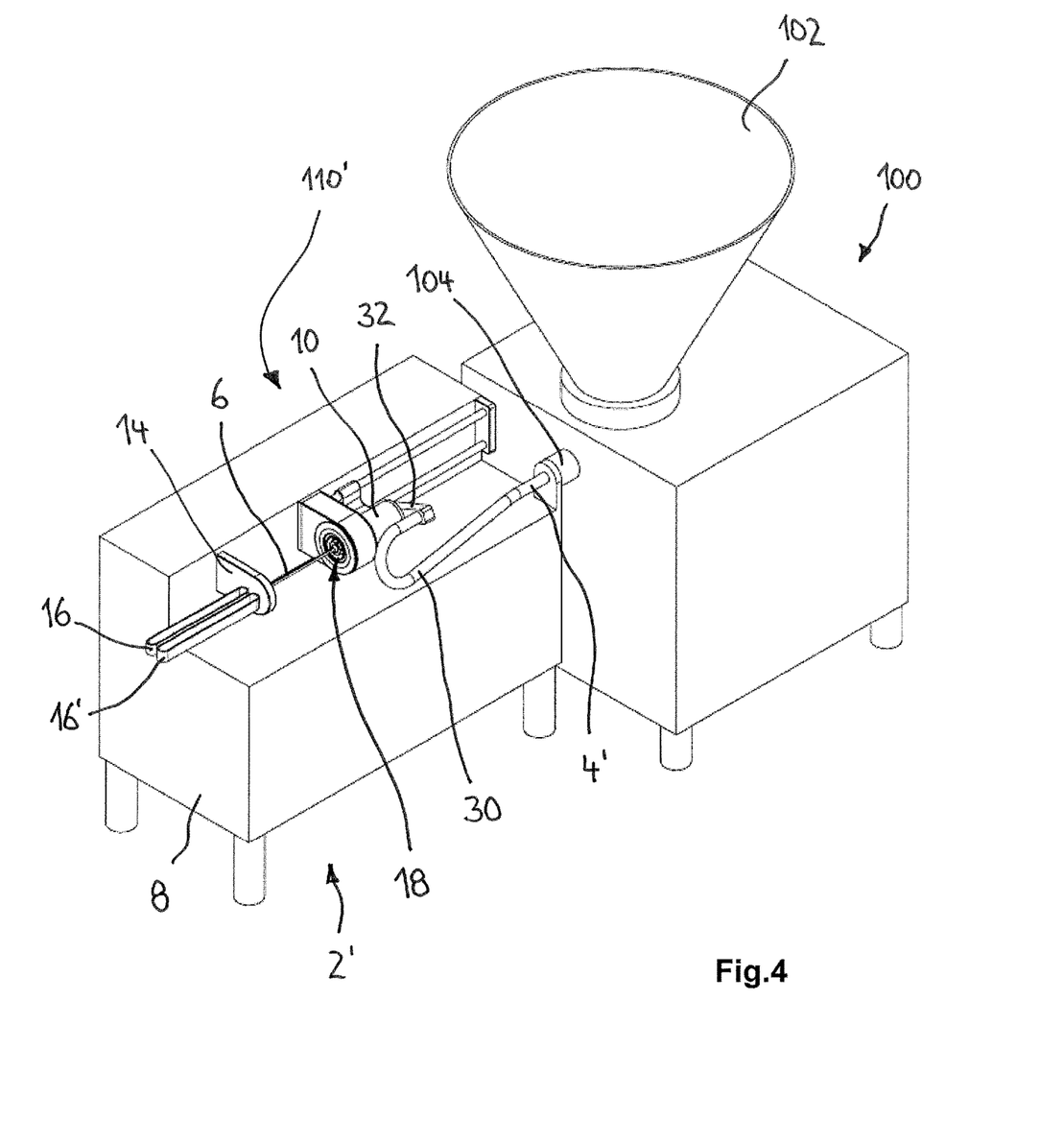
FIG. 4 shows a perspective view of a machine for filling tubular cases in accordance with a second embodiment of the invention.

FIG. 4 shows an alternative configuration of a filling machine 100 which also has a filling hopper 102 and an extrusion head 104. A filling apparatus 2' in the form of an attachment 110' is again connected upstream of the filling machine 100. The filling apparatus 2' is fluidically coupled to the filling tube 6 of the filling apparatus 2' by way of a feed conduit 4'. The filling apparatus 2' differs from the filling apparatus 2 shown in FIGS. 1 through 3 by the configuration of the feed conduit 4'. The extrusion head 104 is connected to the filling tube 6 by a conveyor hose 30 which constitutes at least a portion of the feed conduit 4'. The extrusion head 104 and the central axis of the rotatably and drivable mounted filling tube 6 are not oriented or arranged coaxially in the present embodiment shown in FIG. 4. The central axis of extrusion head 104 and the longitudinal axis or axis of rotation of the filling tube 6 involve a lateral displacement relative to each other.

Figure 5:
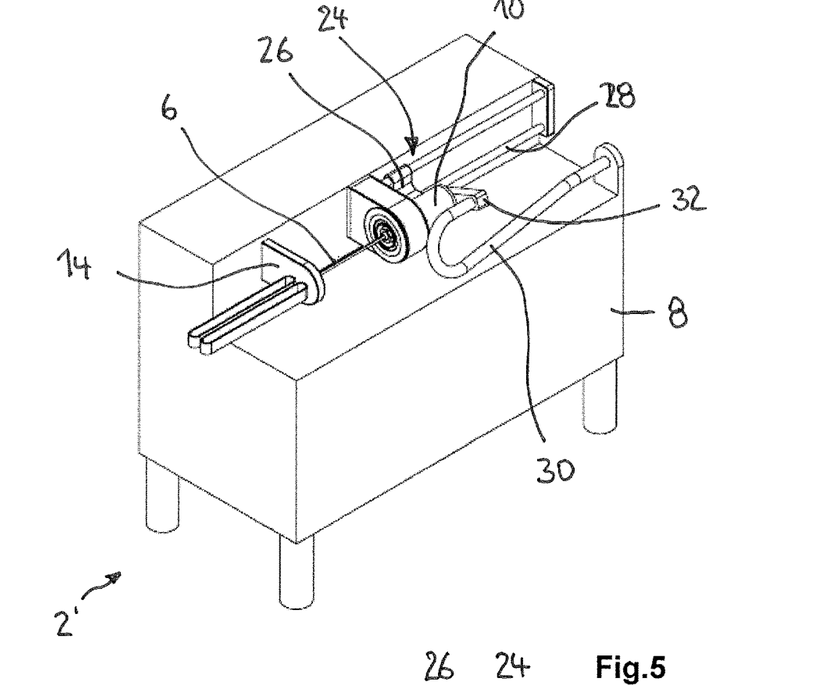
FIG. 5 shows a perspective view of the filling apparatus of FIG. 4 with the filling tube in one position.
Figure 6:
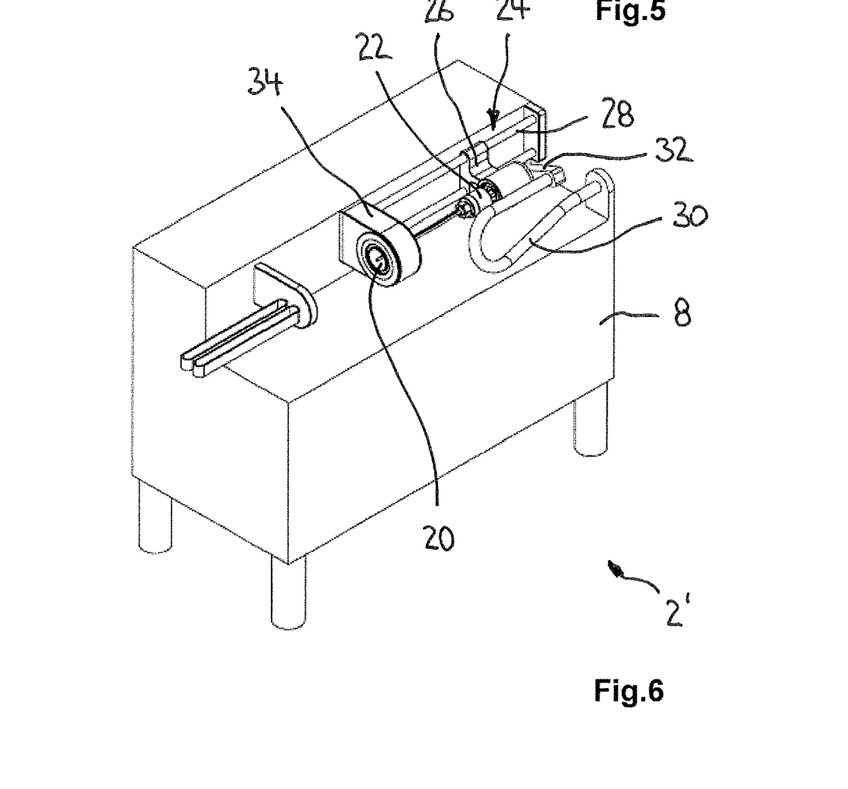
FIG. 6 shows a perspective view of the filling apparatus of FIG. 5 with the filling tube in another position.

FIG. 5 shows the filling position in which filling of a tubular case which has been drawn on to the filling tube 6 is performed. The driven rotor 22 in the filling position has been moved completely into the drive rotor 20 of the magnetic coupling 18. In the filling position the front or free end of the filling tube 6 has also been moved into the casing braking ring 14' (FIG. 8) of the casing braking unit 14. The feed conduit 4' which has a conveyor hose 30 also has a connecting portion 32 projecting substantially perpendicularly relative to the longitudinal axis of the filling tube 6. The connecting portion 32 is fluidically connected with an end to the receiving portion 10. An end of the conveyor hose 30 is connected at the opposite end of the connecting portion 32. FIG. 6 again shows the loading position of the filling tube 6 for fitting it with a fresh case. The conveyor hose 30 of the feed conduit 4' is laid in a loop. The entry flow direction of the pasty material into the conveyor hose and the exit direction of the pasty material from the conveyor hose 30 are mutually opposite directions in the present embodiment.

Figure 7:
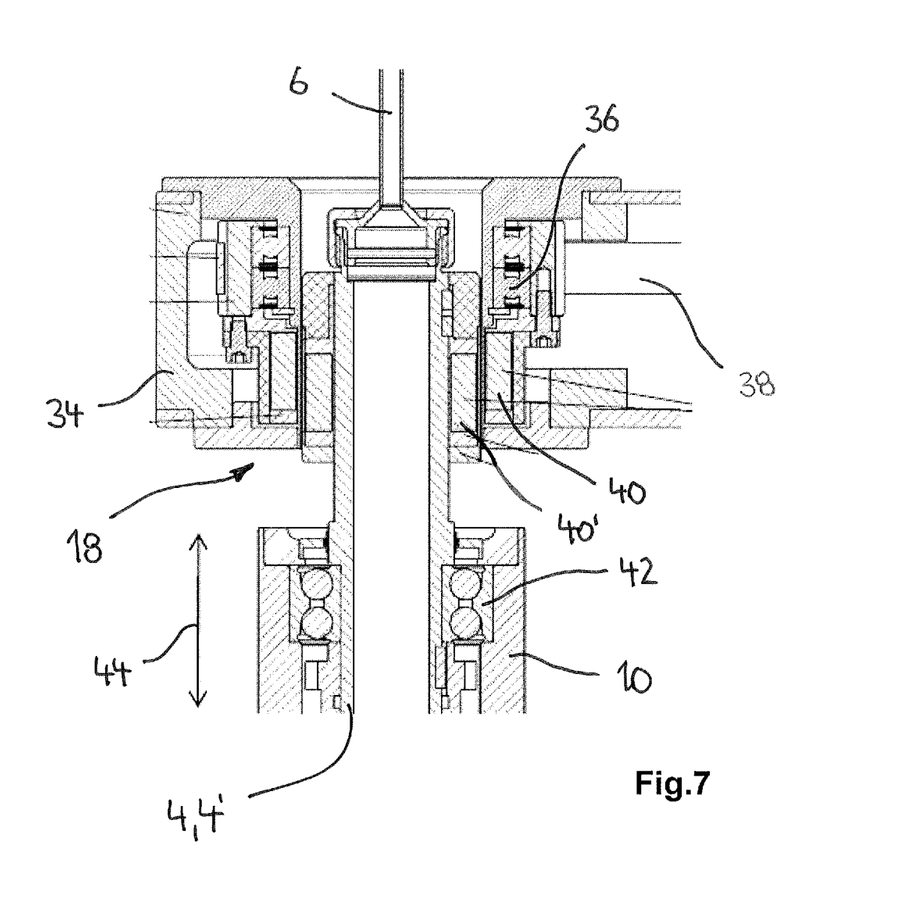
FIG. 7 shows a cross-sectional view of a first embodiment of a magnetic coupling according to the invention.

FIG. 7 shows a sectional view of the magnetic coupling 18 according to the invention. The drive rotor is rotatably accommodated within a twisting-off housing 34, see also FIGS. 1 through 6, by way of at least one rotary bearing 36. The drive rotor 20 is coupled by way of a toothed belt 38 to the drive unit 12 (FIG. 8) for transmitting its rotary movement. The driven rotor 22 is moved into the drive rotor 20 for making the force-locking connection between the drive rotor 20 and the driven rotor 22 and for transmitting the rotary movement from the drive rotor to the driven rotor. The drive rotor 20 and the driven rotor 22 have a plurality of permanent magnets 40, 40'. Mutually opposite magnets of the drive rotor 20 and the driven rotor 22 are of different polarities. The driven rotor 22 is arranged at a portion of the feed conduit 4, 4' which is held by way of a rotary bearing 42 on the receiving portion 10. The filling tube 6 is arranged at the free end of the feed conduit 4, 4'. The receiving portion 10 together with the feed conduit 4, 4' and the filling tube 6 is carried in a displaceable manner in the direction of the longitudinal axis or the axis of rotation of the feed conduit 4, 4' and the filling tube 6, as is to be indicated by the movement arrow 44.

Figure 8:
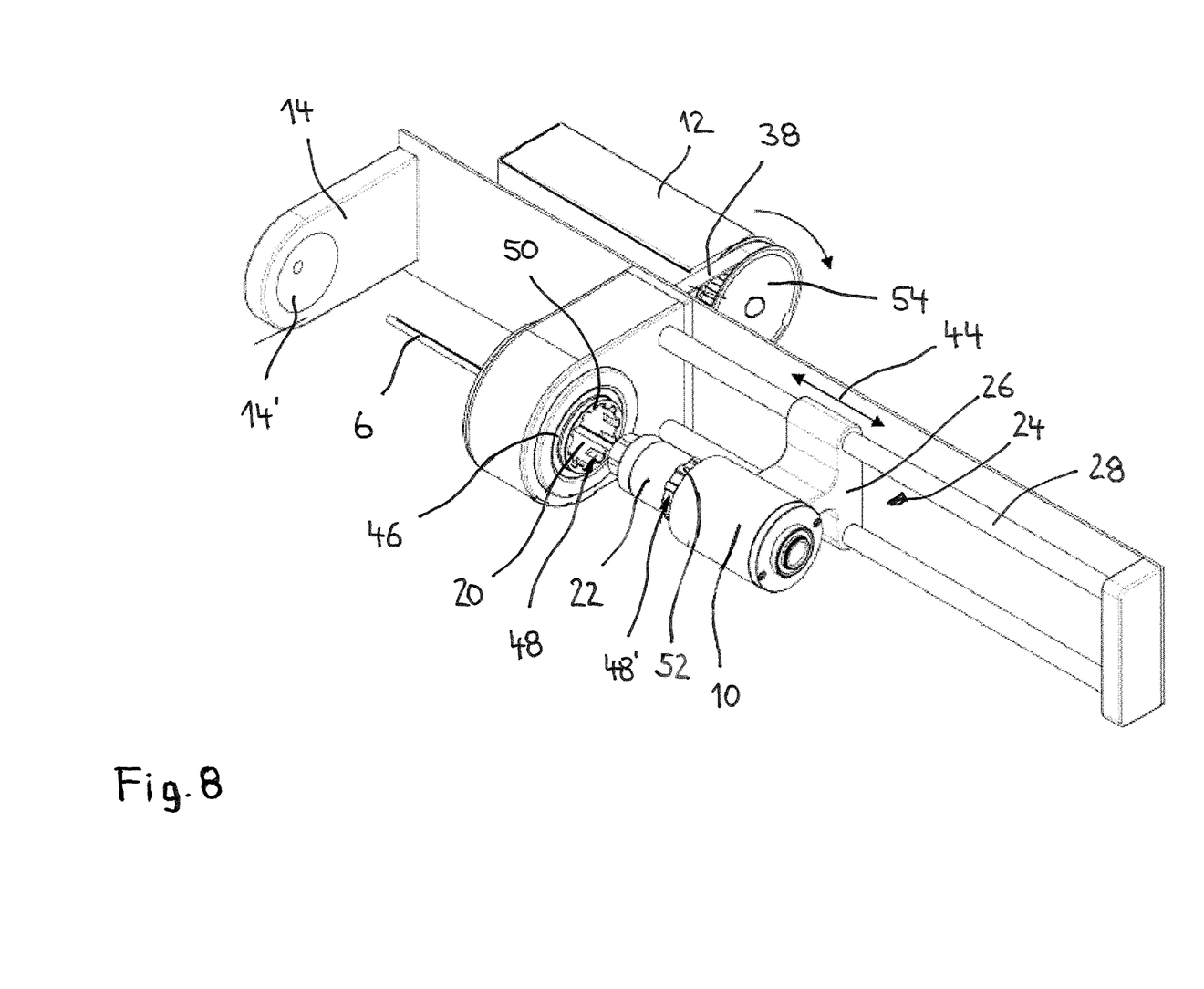
FIG. 8 shows a perspective view of a second embodiment of a magnetic coupling according to the invention.

FIG. 8 shows a perspective view of components of the filling apparatus 2 according to the invention. Besides the magnetic coupling 18 with its drive rotor 20 and its driven rotor 22 the illustrated embodiment additionally provides a tooth coupling 46 with inter-engaging coupling portions 48, 48'. The coupling portion 48 which is arranged or provided on the drive rotor has inwardly projecting positively locking elements. The coupling portion 48' arranged or provided on the driven rotor 22 has outwardly projecting positively locking elements 52. Besides the force-locking connection made by the permanent magnets of the drive rotor 20 and the driven rotor 22, a positively locking connection is produced between the coupling portions 48, 48' when the driven rotor 22 moves into the drive rotor 20. With that inward movement the free end of the filling tube 6 is also coupled into the casing braking ring 14' of the casing braking unit 14. Preferably pre-alignment of the coupling portions of the tooth coupling 46 relative to each other is effected by the permanent magnets on the drive rotor and the driven rotor. This facilitates the movement of the coupling portions 48, 48' one into the other. This embodiment also provides that the filling tube 6 is driven by the drive unit 12 having a drive pulley 54 cooperating with the toothed belt 38. The guide carriage 26 of the guide device 24 is held slidably by way of two guide tubes 28 arranged parallel to the longitudinal axis or the axis of rotation of the filling tube 6.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCES 2, 2' filling apparatus
4, 4' feed conduit
6 filling tube
8 machine frame structure
10 receiving portion
12 drive unit
14 casing braking unit
14' casing braking ring
16, 16' conveyor elements
18 magnetic coupling
20 drive rotor
22 driven rotor
24 guide device
26 guide carriage
28 guide tube
30 conveyor hose
32 connecting portion
34 twisting-off housing
36 rotary bearing
38 toothed belt
40, 40' permanent magnet
42 rotary bearing
44 movement arrow
46 tooth coupling
48, 48' coupling portion
50, 52 positively locking element
54 drive pulley
100 machine
102 filling apparatus
104 extrusion headphone
110, 110' attachment

What is claimed is:

1. An apparatus for filling tubular cases with a pasty material, comprising:
    at least one filling tube that is rotatable and drivable about a longitudinal axis thereof and on to which a case which can be filled with the material can be pulled,
    a receiving portion at which the filling tube is rotatably received,
    a drive unit for driving the filling tube, and
    a magnetic coupling for making and breaking an at least force-locking torque transmission between the drive unit and the filling tube, which has a drive rotor and a driven roller that is displaceable relative to the drive rotor in a longitudinal direction of the filling tube.

2. The apparatus of claim 1, wherein the magnetic coupling is a contact-less magnetic coupling, wherein the drive rotor is in the form of an external rotor and the driven rotor is in the form of an internal rotor with coaxially arranged axes of rotation, which cover each other over at least portion-wise for transmission of torque in an axial direction.

3. The apparatus of claim 1, wherein the magnetic coupling is in the form of a permanent magnet coupling, and the drive rotor and/or the driven rotor respectively have one or more permanent magnets.

4. The apparatus of claim 1, wherein the magnetic coupling is in the form of an electromagnetic coupling, and the drive rotor and/or the driven rotor respectively have one or more electromagnets.

5. The apparatus of claim 1, wherein the receiving portion is mounted in a displaceable manner in the longitudinal direction of the filling tube by a guide device.

6. The apparatus of claim 5, wherein the guide device includes at least one guide carriage moveable along a guide extending parallel to the filling tube.

7. The apparatus of claim 1, wherein the driven rotor is non-rotatably coupled to the filling tube.

8. The apparatus of claim 1, wherein the driven rotor is arranged at a feed conduit for the pasty material, at a free end of which a first end of the filling tube is disposed, and wherein the feed conduit is mounted at least with a portion rotatably to the receiving portion.

9. The apparatus of claim 8, wherein the feed conduit is in the form of a variable-length telescopic tube.

10. The apparatus of claim 8, wherein a portion of the feed conduit is in the form of a deformable conveyor hose.

11. The apparatus of claim 1, wherein the drive rotor with respect to an axis of rotation is arranged to be stationary in an axial direction with respect to the drive unit, within a twist-off housing.

12. The apparatus of claim 1, wherein the drive rotor is coupled to the drive unit for transmitting a rotary movement by a toothed belt.

13. The apparatus of claim 1, further comprising:
    a tooth coupling for positively lockingly coupling the drive rotor and the driven rotor, wherein coupling portions that can be brought into engagement with each other are respectively coupled to the drive rotor and the driven rotor.

14. The apparatus of claim 13, wherein the coupling portions include a plurality of positively locking elements that project inwardly in a radial direction on the drive rotor and outwardly in a radial direction on the driven rotor, which are adapted to be brought into engagement with each other and out of engagement with each other by a movement of the drive rotor and the driven rotor in the longitudinal direction of the filling tube.

15. The apparatus of claim 14, wherein the tooth coupling operates such that the positively locking elements of the drive rotor and the driven rotor move axially relative to each other.

16. The apparatus of claim 1, further comprising:
a casing braking unit that is selectively operatively connected to a case drawn on to the filling tube in a region of an oppositely disposed second open end of the filling tube.

17. A filling machine for producing sausages of pasty material, such as sausage meat, the filling machine comprising:
a filling hopper for receiving the pasty material,
a conveyor pump for conveying the pasty material, and
an apparatus for filling tubular cases with the pasty material, the apparatus comprising:
at least one filling tube that is rotatable and drivable about a longitudinal axis thereof and on to which a case which can be filled with the material can be pulled,
a receiving portion at which the filling tube is rotatably received,
a drive unit for driving the filling tube, and
a magnetic coupling for making and breaking an at least force-locking torque transmission between the drive unit and the filling tube, which has a drive rotor and a driven roller that is displaceable relative to the drive rotor in a longitudinal direction of the filling tube.

* * * * *

UNITED STATES PATENT AND TRADEMARK OFFICE
CERTIFICATE OF CORRECTION

PATENT NO. : 10,512,274 B2
APPLICATION NO. : 16/225494
DATED : December 24, 2019
INVENTOR(S) : Matthias Mach et al.

It is certified that error appears in the above-identified patent and that said Letters Patent is hereby corrected as shown below:

On the Title Page

Item [73], delete "VEMAG Maschinenbau Gmbh" and insert -- VEMAG Maschinenbau GmbH --.

Item [57], Line 11, delete "tube, which has a drive rotor and a driven roller that is" and insert -- tube, which has a drive rotor and a driven rotor that is --.

In the Specification

Column 2, Line 15, delete "has a drive rotor and a driven roller which is displaceable" and insert -- has a drive rotor and a driven rotor which is displaceable --.

Column 4, Line 14, delete "conduit is of an outside diameter which a multiple greater" and insert -- conduit is of an outside diameter which is a multiple greater --.

Column 4, Line 40, delete "hose used as the feed conduit is laid in the form a loop in a" and insert -- hose used as the feed conduit is laid in the form of a loop in a --.

Column 6, Line 51, delete "ings, which are incorporated in and constitutes a part of this" and insert -- ings, which are incorporated in and constitute a part of this --.

Column 9, Line 37, delete "of preferred embodiments of the present invention, and do" and should read -- of preferred embodiments of the present invention, and are --.

In the Claims

Claim 1, Column 10, Line 25, delete "driven roller that is displaceable relative to the drive" and insert -- driven rotor that is displaceable relative to the drive --.

Signed and Sealed this
Fifth Day of May, 2020

Andrei Iancu
*Director of the United States Patent and Trademark Office*

Claim 17, Column 12, Line 18, delete "and a driven roller that is displaceable relative to the" and insert -- and a driven rotor that is displaceable relative to the --.